April 16, 1963 R. W. TWADDELL ETAL 3,086,070
MOUNTING FOR ELECTRICAL ELEMENTS
Filed July 12, 1957 2 Sheets-Sheet 1
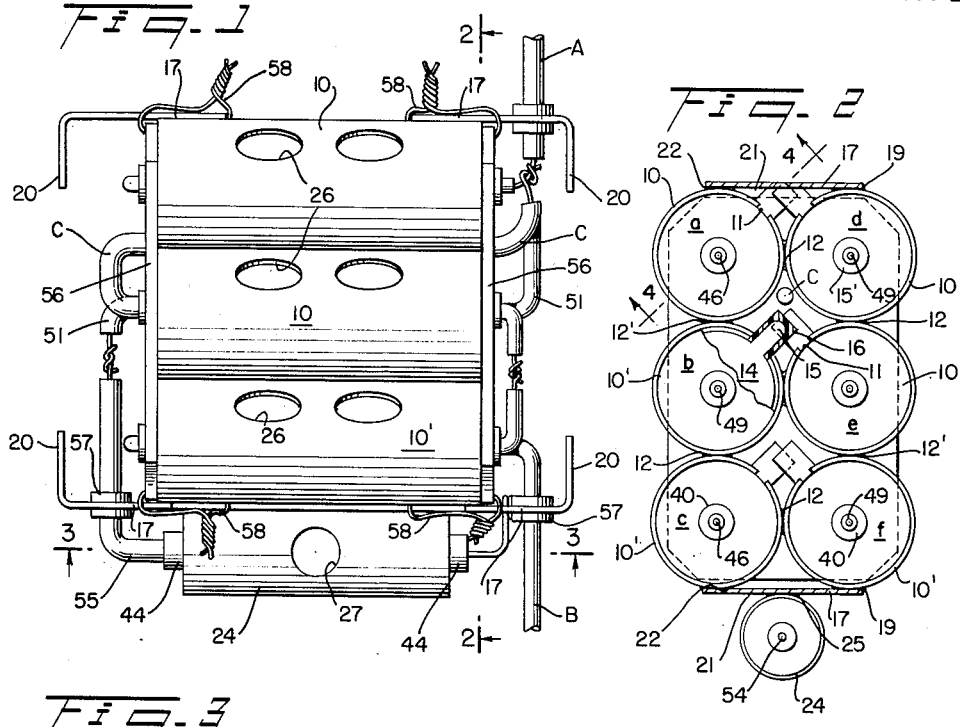
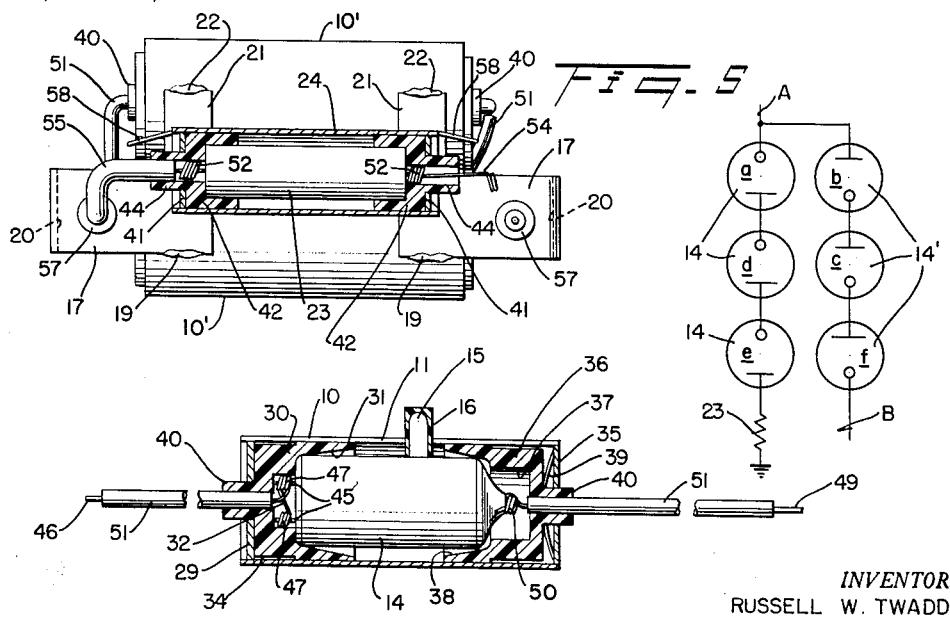
*INVENTORS*
RUSSELL W. TWADDELL
RICHARD J. DAVIES
FREDERICK E. HANNI
BY Bauer and Seymour
ATTORNEYS

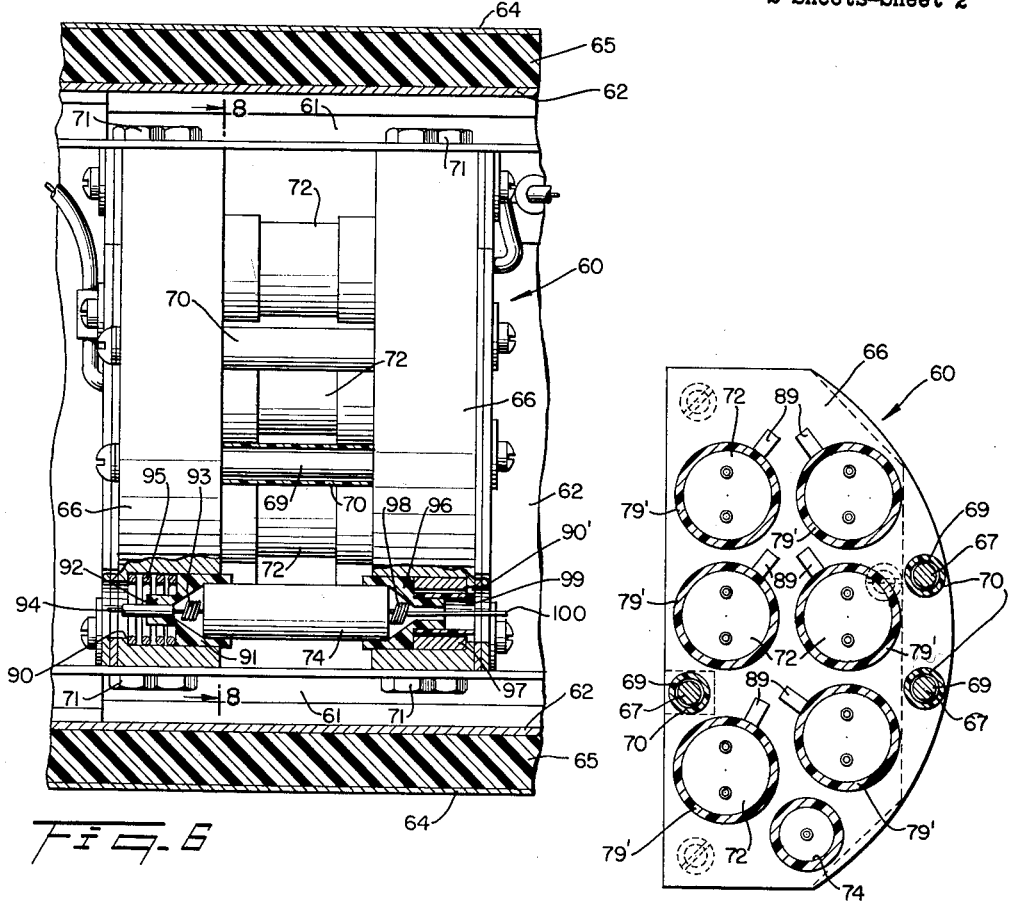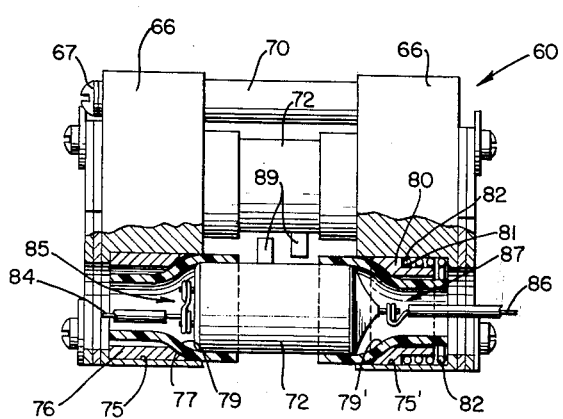

United States Patent Office 3,086,070
Patented Apr. 16, 1963

3,086,070
MOUNTING FOR ELECTRICAL ELEMENTS
Russell W. Twaddell, Sidney, Richard J. Davies, Afton, and Frederick E. Hanni, Sidney, N.Y., assignors to The Bendix Corporation, a corporation of Delaware
Filed July 12, 1957, Ser. No. 671,462
16 Claims. (Cl. 174—52)

This invention relates to a mounting device for electrical circuit elements, and more particularly relates to a mounting device for elements such as rectifiers and resistors which are subjected to high temperatures during use.

Among the objects of the invention is the provision of a novel mounting for elements of electrical circuits.

A further object of the invention resides in the provision of a novel mounting device for an electrical element subjected to high temperatures during use, the mounting protecting the element against undue stresses arising from thermal expansion, and also from mechanical shocks.

Yet another object of the invention is the provision of novel means for mounting and connecting a plurality of circuit elements subjected to high temperatures during use, whereby the elements and their connections are safeguarded from short circuits.

Yet another object of the invention is to provide a novel device for mounting circuit elements such as rectifier tubes and resistors subjected to high temperatures during use, the mounting being of such construction as to allow the circulation of a cooling fluid in intimate contact with such elements.

A further object is to provide a mounting device of the type described the parts of which are easily and economically fabricated and assembled.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

In the drawings, wherein like reference characters refer to like parts throughout the several views, FIG. 1 is a view in side elevation of the first embodiment of mounting device for a plurality of rectifier tubes and a resistor making up a sub-circuit for an igniter device;

FIG. 2 is a somewhat fragmentary view in vertical section through the mounting device of FIG. 1, the section being taken along the line 2—2 of FIG. 1, certain parts such as lead wires and fastening devices being omitted for clarity of illustration;

FIG. 3 is a view in end elevation of the mounting device, the view being taken in an upward direction in FIG. 1, the housing for the resistor of the sub-circuit being shown in axial section, the section being taken along the line 3—3 of FIG. 1, the resistor being shown in elevation;

FIG. 4 is a view generally in axial section through a housing containing one of the rectifier elements of the sub-circuit, the section being taken generally along the line 4—4 of FIG. 2, certain of the parts being shown in elevation;

FIG. 5 is a wiring diagram of the sub-circuit the elements of which are supported and housed by the apparatus of FIGS. 1-4, inclusive;

FIG. 6 is a view partly in side elevation and partly in longitudinal section through a second embodiment of mounting device for a plurality of rectifier tubes;

FIG. 7 is a view partly in end elevation and partly in longitudinal section through the mounting device of FIG. 6; and FIG. 8 is a view in transverse section through the mounting device of FIGS. 6 and 7, the section being taken along the line 8—8 of FIG. 6.

For the purpose of illustration, the mounting device shown is that forming a part of an igniter device which is disclosed in Russell W. Twaddell U.S. Patents Nos. 2,942,167 and 3,020,449, and Donald C. Loudon application Serial No. 665,558, filed June 13, 1957 and superseded by continuation application Serial No. 236,885, filed November 13, 1962. It is to be expressly understood, however, that the mounting device of the invention is not restricted in its use to the embodiment shown in the present invention or to its use as a part of the igniter device disclosed in the three other applications above referred to.

In the embodiments disclosed the mounting device of the invention is employed to house and protect a bank of rectifier tubes and a resistor connected to form a sub-circuit as shown in FIG. 5. The sub-circuit shown in such figures includes a branched lead wire A which has two reversely connected banks of rectifier element interposed in the two branches thereof. The rectifier elements, shown as tubes herein, are each designated 14 in one such bank and 14' in the other. Beyond the last tube 14, the respective branch of wire A is connected to ground through a resistor 23. The last rectifier tube 14' is connected to a lead wire B. For further description of the sub-circuit, and of the igniter circuit of which it is a part, reference may be had to the above referred to Loudon application Serial No. 665,558.

The mounting device of the present invention displays particular advantages for supporting and protecting circuit elements of apparatus which is maintained at high temperatures when in use. In its disclosed embodiment the mounting device forms a part of an igniter for a ramjet engine. Such igniter is advantageously mounted close to the engine, so that if it were not cooled during operation it would reach temperatures on the order of 900° F. In order to cool the igniter somewhat, the circuit elements thereof are mounted in a fluid-tight container through which a cooling fluid is forced under pressure. In the igniter under consideration the coolant is the liquid hydrocarbon fuel for the engine, the fuel passing through the igniter housing prior to its entry into the combustion chamber of the engine. To secure the full benefit of the cooling fluid, such fluid is brought into intimate contact with a large part of the surface of the elements themselves. By reason of the action of the cooling fluid, the operating temperature of the parts of the igniter device is reduced to approximately 500° F. Accordingly, satisfactory mounting devices for the elements must not only be markedly resistant to heat, but must also be resistant to deterioration by liquid hydrocarbon fuels. In addition, the various electrical connections to the circuit elements and the connections between the leads therefrom must be such as not only to withstand a marked amount of vibration, substantial thermal expansion and contraction, and elevated working temperatures, but they must be so located and arranged as not to cause electrical leakage or flash-over between them.

Turning now to a detailed description of the first disclosed embodiment of the mounting device, shown in FIGS. 1 to 4, inclusive, it will be seen that such device includes six circular cylindrical sheaths or housings 10 and 10' arranged in two parallel rows of three housings each. Housings 10 and 10' are preferably made of sheet metal such as steel. Each of the housings has a slot 11 therein extending throughout its length. Each housing receives a rectifier tube disposed axially thereof therewithin. The inner diameter of the housing somewhat exceeds the outer diameter of the main extent of the cylindrical sheath of the rectifier tube. The tubes 14 shown are of the type having a glass sheath and a radially extending side exhaust nib 15 thereon, such nib together with a short section 16 of electrically insulating tubing telescoped thereover being received within the slot 11 in the housing.

The housings 10 and 10' are preferably first bent up individually, following which a set of three housings 10 are secured together in a right-angle formation by spot welds 12 at the zones of tangency between adjacent housings. Another similar right-angle assembly of three housings 10' is formed by welding them together in the same manner. During such assembly of the two sets of three housings the slots 11 in such housings are oriented generally as shown in FIG. 2 with respect to each other, so that the nibs 15 of adjacent rectifier tubes will clear each other and also the adjacent housing in the manner shown. The two sub-assemblies of three housings are now placed together to form the complete assembly and are spot-welded together at their zones of tangency as indicated at 12'. The resulting structure, which is strong but yieldable under thermal expansion and contraction, forms the main framework of the mounting device. Such framework, together with the elements housed thereby, are supported within the housing of the above-referred-to igniter unit by the means of bracket plates having portions 17 thereof centrally overlying the two housings, 10, 10', at the opposite ends of the assembly, plate portions 17 being welded to such housings as shown at 19. The outer ends of the brackets are bent at right angles with respect to portion 17 thereof to form mounting flanges or feet 20. In order to attach plate 17 more securely to the housing, the plates are provided with parallel side wings 21 the ends of which are attached to the respective housings by welds 22. Bracket plates 17 also provide support for various wires of the sub-circuit, two wires being shown in FIG. 1 passing through grommets 57 mounted in openings in the bracket plates.

Resistor 23 is mounted in a circular cylindrical housing 24 positioned at one end of the assembly of housings 10, 10' and parallel to such rectifier housings. Housing 24 is secured to the assembly by being spot-welded to the wings 21 of the respective end plate 17. The housing 24 has an internal diameter appreciably greater than that of resistor 23 so as to allow the circulation of cooling fluid about the greater part of the surface of the resistor. Rectifier housings 10, 10' and resistor housings 24 have openings 26 and 27, respectively, through their side walls to allow ingress and egress of the cooling fluid. Preferably such openings are disposed in generally diametrically opposed portions of the walls of the housings.

The manner of mounting of the rectifier tubes 14 in their housings 10, 10' will be more readily apparent upon consideration of FIG. 4. The housing there shown, designated 10, has a first end closure member 29 connected thereto as by welding and a similar closure member 35 similarly connected to the housing. An electrically insulating and heat resistant member 30 having a cup-like body is positioned at one end of the housing abutting closure member 29. Member 30 has an outwardly projecting apertured boss or sleeve 40 integral therewith, such boss projecting through a central opening in closure member 29. Member 30 has a central wall or recess 32 which receives connector pins 45 at the base end of the rectifier tube as well as the turns of wire 47 which are connected to such pins in a manner to be described. Wire 46, which has an insulating sheath 51, extends outwardly of the housing through boss 40 on member 30. Radially outwardly of well 32, member 30 is provided with an annular seat against which the end of rectifier tube 14 abuts, and an inwardly extending flared side wall portion 31 which extends partway along the length of the rectifier tube. Member 30, as well as grommets 57, tubes 16, and the insulating coverings or sheaths on the various wires, may be made of a material sold under the trademark "Teflon" sold by E. I. du Pont de Nemours. Such material is at least slightly resilient, so that it protects tube 14 from mechanical shock as well as electrically insulating it.

The other end of tube 14 is mounted in a member 36 which generally resembles member 30. Member 36, which may likewise be made of "Teflon," has a frusto-conical seat 38 receiving the end of tube 14. Member 36 has a relatively large well or recess 37 which receives the single connector pin of the tube 14 leading to the anode thereof as well as the connecting coil of wire 50 formed at the end of wire 49. Wire 49, which is provided with an insulating sheath 51, extends through the outwardly directed sleeve or boss 40 on member 36.

Tube 14 is yieldingly maintained under axial compression so as firmly to retain it cradled at all times in the seats in members 30 and 36, regardless of wide variations in the temperature to which the apparatus is subjected. Such result is accomplished by the provision of a curved spring washer 39 which is interposed between the end wall of member 36 and end closure member 35 on housing 10. As shown, washer 39 has a central opening therethrough receiving boss 40 of member 36. The parts of the assembly shown in FIG. 4 are made of such diameters that when the apparatus is at room temperature spring 39 maintains tight contact between members 30 and 36 and the ends of tube 14 and that as the parts of the assembly expand upon their being heated to operating temperature spring 39 flexes to allow member 36 to move outwardly to compensate for the resulting dimensional changes in the parts.

Resistor 23 is supported in housing 24 by two oppositely disposed similar-cup shaped insulating members 42 which likewise may be made of "Teflon." Members 42 have outwardly directed sleeve-like extensions 44 thereon projecting through central openings in end closure members 41 and snugly receiving the insulating sheath 53 on the lead wires connected to the opposite ends of the resistor. The lead wires are connected to the terminals of the resistor through coils 52 which are attached to the terminals in the same manner, to be described, as wire coil 50 on the anode pin of rectifier tube 14.

The mounting assembly is completed by end plates 56, likewise preferably made of "Teflon," which overlie the opposite ends of housings 10, 10' and receive the sleeves 40 of the rectifier supporting means 30 and 36 in appropriately located holes therethrough. End plates 56 are held in place on the assembly of housings 10, 10' by a plurality of tie wires 58 which extend through holes in the housings 10, 10' and the end plates 56, and have their ends twisted together as shown in FIG. 1. Such manner of the attachment of the end plates is preferred since it is quick and economical and avoids the application of heat or mechanical shock to the assembly which, of course, then contains the rectifier tubes 14. In addition, tie wires 58 hold end plates 56 somewhat yieldingly, so that they do not impose any marked stresses upon the expansion and contraction of the latter.

The rectifier tubes 14 are in the embodiment shown of the cold cathode type which when sold has a cap connected to the anode lead (at the right in FIG. 4) and a plurality of pins projecting from its opposite or base end. In preparing the tube in the present assembly, the cap is removed from the anode lead, and all the pins projecting from its base except the two connected to the cathode are clipped short. After the remaining pins have been cleaned, their lead wires are wrapped about them as shown in FIG. 4 by starting the coil from the outer end of the pin and progressing inwardly. In the case of the anode lead there is but one such coil, shown at 50. At the base end of the tube, a coil 47 is formed on one of the cathode lead pins by wrapping the wire from the free or outer end of the pin inwardly toward the base of the tube, following which the wire is carried across to form a similar coil 47 on the other pin. A suitable flux is now applied to each coil, and the wires are then brazed to the pins by quickly dipping the pin or pins into a molten silver solder bath. The pin is immersed in the solder bath to a depth sufficient to braze only the outer turn of the coil, and is held in the bath no longer than is required to braze the joint. The resulting joint is one which gives a perfect electrical contact, as well as eliminating bending of the lead wires on short radii when the parts of the mounting device and the lead wires change in dimension upon the heating and cooling of the device. The outer turn of the coil is soldered to the pin, and thus makes perfect electrical connection therewith. The remainder of the coil of the wire, integral with the soldered turn, and that extending therefrom remain free from attachment to the pin and thus can yield when required over their entire extents rather than over merely a short zone, which would result if the entire coil were soldered or otherwise secured to the pin.

The rectifier 14 is then assembled in the housing, which has previously had one of closure members 29 and 35 secured thereto. After the second tube-supporting member 30 or 36 has been put in place and the other parts assembled as shown, the second end closure member is applied to the housing and is pressed with considerable force inwardly of the housing so as to subject spring washer 39 to an initial load. Following this, such second closure member is secured as by welding to the housing. Resistor 23 is connected to its lead wires and is assembled in its housing 24 in substantially the same manner, with the exception that the resistor is not initially placed under any appreciable endwise compression.

For ease in understanding the actual connections between the various rectifier tubes and the resistor, the rectifier tubes in the left hand vertical row in FIG. 2 are designated, from top to bottom, a, b, and c, and those in the right hand vertical row are designated d, e, and f. The ends of the rectifier tubes facing the reader in FIG. 2 are designated the "upper ends," and those remote from the reader in such figure are designated the "lower ends." Employing such nomenclature: Lead wire A branches as shown at the right in FIG. 1. One branch of wire A leads to the upper end of tube a, connects the bottom ends of tubes a and d, connects the upper ends of tubes d and e, and then connects the lower end of tube e to one end of resistor 23, the other end of the resistor being connected to ground, which in this instance is the frame of the mounting device, as shown at the lower right hand corner in FIG. 1. The other branch C of wire A is led through the insulating plates 56 at opposite ends of the mounting device as shown in FIGS. 1 and 2 to the bottom end of tube b; such wire then connects in turn the upper ends of tubes b and c, and the lower ends of tubes c and f. Lead wire B is connected to the upper end of tube f.

With such arrangement of the rectifier tubes, the exhaust nibs 15 of the top and bottom pair of tubes in FIG. 2 readily clear each other, since the tubes making up each pair are reversed end-for-end with respect to each other. The rectifier tubes of the middle pair are disposed in the same direction. Their exhaust nibs may be made to clear each other by disposing the compression spring 39 at the opposite ends of the respective housings, as well as securing end closure member 29 somewhat inwardly of the end of one housing 10, as shown in FIG. 4, and securing end closure 35 of the other housing 10' of such pair somewhat inwardly of such housing. Thus, the assembly shown is characterized by its compactness and by its freedom of tendencies to short circuit under the arduous operating conditions outlined above.

The second illustrative embodiment of a mounting device for electrical circuit elements is shown in FIGS. 6, 7, and 8. Such mounting device, there designated generally by the reference character 60, may be used in an igniter in place of the mounting device of the first described embodiment. The second embodiment has the advantage of increased rigidity of the mounting device itself and also that it functions to brace the main frame parts of the igniter. In FIG. 6 parts of the igniter housing and frame are shown with device 60 operatively connected thereto.

The igniter unit there fragmentarily shown has two spaced parallel main frame members 61 which extend between and are connected to end closure members (not shown) for an inner circular cylindrical housing 62 of the igniter. A second outer housing 64 is positioned coaxial of housing 62, the space between the inner and outer housing being filled with heat-insulating material 65. Device 60 includes two main plate-like members 66, spaced axially of the igniter and positioned between longitudinal frame members 61. Members 66 are connected by studs 67 which extend through one of such members and are threaded into the other, members 66 being spaced by sleeves 69 telescoped over studs 67. To prevent flashover between sleeves 69 and the various electrical elements carried by device 60, electrically insulating sleeves 70, made of material such as "Teflon," are disposed about sleeves 69. Device 60 is rigidly secured to longitudinal frame members 61 by studs 71, as shown.

Device 60, as does the mounting device of the first described embodiment, carries six rectifier tubes 72 and one resistor 74, such elements being connected in the manner shown in FIG. 5. The rectifier tubes 72 and the resistor 74 are carried between members 66, being electrically insulated therefrom and yieldingly cradled therein so as to protect them from mechanical shock. The manner in which the rectifier tubes are mounted will be more clearly understood upon consideration of FIGS. 7 and 8.

As there shown, each of members 66 is provided with six counterbores which are spaced from each other, and which, in the embodiment shown, lie in two parallel rows. The counterbores in the respective members 66 confront, and are aligned with, those on the opposite member. Accurately fitting within the counterbore 75, at the left of FIG. 7, is a metal sleeve 76 having its inner, right hand end inwardly bevelled at 77. An electrically insulating, heat resistant sleeve 79 is positioned within and retained by sleeve 76. Sleeve 79, which may be made of "Teflon," has an inner, right hand end portion of larger diameter which snugly receives the cathode end of rectifier tube 72. Outwardly beyond its larger inner end, sleeve 70 tapers inwardly at substantially the same angle as bevelled zone 77 of sleeve 76, the tapered portion of sleeve 76 being of such diameter as to lie in contact with the bevelled inner end of sleeve 76. Outwardly of its tapered portion, sleeve 79 is of such smaller diameter as to lie spaced radially inwardly from the inner wall of sleeve 76.

The anode end of rectifier tube 72 is held by its respective member 66 in much the same manner. Such end of the tube is cradled within the inner, larger diameter end of a second electrically insulating and heat resistant sleeve, there designated 79', which is substantially the same as sleeve 79. Sleeve 79' is engaged by a metal sleeve 80 in counterbore 75' in the left hand member 66. Sleeve 80 both centers sleeve 79' by engagement between the inner bevelled end of sleeve 80 and the tapered portion of sleeve 79', and also functions resiliently to urge the sleeve 79' axially inwardly so as to maintain the rectifier tube 72 under compression. To accomplish such latter function, sleeve 80 is provided with an annular spring seat 81 at its outer end; a coil compresion spring 82 located in such seat acts between sleeve 80 and the outer end of counterbore 75 constantly to thrust sleeve 79' toward sleeve 79.

Electrical connections are made to the cathode pins and the anode pin in the same manner as shown in FIG. 4. In the second embodiment of the mounting device, a lead wire 84, extending through sleeve 79, is shown connected to the cathode pins by coil connecting means 85. A lead wire 86, extending through sleeve 79', is shown attached to the anode pin by the coil connection 87. As in the first embodiment, the rectifier tubes 72 are located in mounting device 60 in such manner that the exhaust nibs of the various rectifier tubes do not interfere with each other. Such location of tubes 72 is shown in FIGS. 7 and 8. Preferably adjacent tubes are reversed end-for-end, and the exhaust nibs are electrically insulated by short lengths of "Teflon" tubing 89 telescoped thereover, as shown.

The resistor 74 is mounted in device 60 in the manner shown in FIGS. 6 and 8. Each member 66 has a counterbore at one end thereof, such counterbores 90 and 90' being aligned with and confronting each other. An electrically insulating heat resistant sleeve 91 accurately but slidingly fits within the counterbore 90, at the left in FIG. 6. Sleeve 91 has a larger inner end portion which snugly receives one end of the resistor, an outer smaller end portion which receives lead wire 94 extending therethrough, and an intermediate cavity therein designed to receive the coil 93 by which wire 94 is connected to the resistor. A coil compression spring 95, interposed between the enlarged inner end of sleeve 91 and the outer end of counterbore 90, functions constantly to urge sleeve 91 axially inwardly.

A second sleeve member 96, which may be similar to sleeve 91, is fixedly mounted in counterbore 90', in the right hand member 66. A metal sleeve 97, snugly received in counterbore 90', is interposed between the outer end of the counterbore and the inner enlarged end of sleeve 96. A second lead wire 100 is connected to the terminal at such end of the resistor by the coil 98. Connecting coils 93 and 98 may be formed in the same manner as coils 52 and 54, described in connection with FIG. 3.

Although only two embodiments of the invention have been illustrated in the accompanying drawings and described in the foregoing specification, it is to be expressly understood that various changes, such as in the relative dimensions of the parts, materials used, and the like as well as the suggested manner of use of the mounting device of the invention, may be made therein without departing from the spirit and scope of the invention as will now be apparent to those skilled in the art.

What is claimed is:

1. Electrical apparatus comprising an at least generally cylindrical electrical circuit element having a generally radially disposed projection on one side thereof and an at least generally cylindrical axially slotted housing disposed about the element coaxially thereof and having its side wall spaced from the side wall of the element, the projection on the element extending through the slot in the housing, disc-like cross members secured to the opposite ends of the housing, and an electrically insulating element-cradling support at each end of the housing interposed between the cross member and the element.

2. Electrical apparatus as defined in claim 1, wherein the element is a tube and the projection is a hollow nib communicating with the space within the tube, and comprising a tubular layer of insulating material disposed about the nib and projecting therewith through the slot in the housing.

3. Electrical apparatus as defined in claim 2, wherein the element-cradling supports have inwardly facing seats which are coaxial of the housing and receive the respective ends of the tube and wherein the cross members have central holes therethrough, comprising lead wires connected to the opposite ends of the tube and extending generally axially therefrom, and central outwardly extending sleeves on the supports embracing the lead wires and extending through and closely fitting the holes in the respective cross members.

4. Electrical apparatus as defined in claim 3, comprising a curved disc-like spring within the housing, the spring being interposed between a support and its adjacent cross member, the spring having a central hole therein through which the sleeve of said support passes, the spring being under substantial axial compression at room temperature whereby it subjects the tube and its supports to appreciable axial pressure throughout a wide range of temperature variation from room temperature upwards.

5. Electrical apparatus as defined in claim 3 wherein there is a terminal pin at each end of said tube extending generally axially outwardly therefrom, and wherein said lead wires are flexible and connected to said terminal pins and extending outwardly generally in alignment therewith, said joint comprising a multiple turn single thickness coil formed in the end of each lead wire and closely embracing each terminal pin, the free end of each coil lying inwardly of the outer end of each pin and the other end of each coil lying inwardly of the outer end of each pin whereby the main run of the lead wire leaves each pin inwardly of the inner end of the coil on the pin and overlies the pin and the turns of the coil thereon throughout portions of the lengths of each pin and coil, the turn of the coil at the outer end of each pin being permanently secured to each pin, the remainder of the turns of each coil being free of attachment to a pin.

6. A joint between an electrical circuit element having an outwardly projecting terminal pin and a flexible lead wire connected thereto and extending outwardly generally in alignment therewith, said joint comprising a multiple turn single thickness coil formed in the end of the wire and closely embracing the pin, the free end of the coil lying adjacent the outer end of the pin and the other end of the coil lying inwardly of the outer end of the pin whereby the main run of the lead wire leaves the pin inwardly of the inner end of the coil on the pin and overlies the pin and the turns of the coil thereon throughout portions of the lengths of the pin and coil, the turn of the coil at the outer end of the pin being permanently secured to the pin by a fused metal bond, the remainder of the wire in the coil being free of attachment to the pin.

7. A mounting device for a plurality of similar at least generally cylindrical electrical circuit elements comprising a plurality of at least generally cylindrical housings disposed parallel to each other and with each housing tangent to at least one adjacent housing, the housings being secured together at their zones of tangency, each housing containing a circuit element coaxial thereof and having its side wall spaced from the side wall of the element, end members secured to the opposite ends of the housing, and an electrically insulating element-cradling support at each end of the housing interposed between the end member and the element.

8. A mounting device as defined in claim 7, said device being adapted for subjection to a cooling fluid, comprising a plurality of passages through the walls of the housings for the admission of the cooling fluid to the surfaces of the elements.

9. A mounting device for a plurality of similar at least generally cylindrical electrical circuit elements comprising a plurality of at least generally cylindrical housings disposed in a plurality of similar rows which are parallel to each other, each housing being tangent to at least two adjacent housings, the housings being secured together at their zones of tangency, each housing containing a circuit element coaxial thereof and having its side wall spaced from the side wall of the element, end members secured to the opposite ends of the housing, and an electrically insulating element-cradling support at each end of the housing interposed between the end member and the element.

10. A mounting device as defined in claim 9, wherein the elements have terminals at their opposite ends and wires connected to the terminals, and comprising insulating end plates overlying the ends of the housings and secured to structure formed by the connected housings, the wires from the elements projecting through holes in the end plates, and circuit-forming connections between selected ones of the wires, said connections lying outwardly of the end plates.

11. A mounting device as defined in claim 10, wherein the element-cradling supports in the housings have outwardly projecting sleeves embracing the wires connected to the elements, and wherein the portions of the sleeves outwardly of the housings project into holes in the end plates.

12. A mounting device for a plurality of similar at least generally cylindrical electrical circuit elements, comprising two opposed parallel plate members, a plurality of confronting aligned bores in the plate members, an electrically insulating resilient sleeve supported in each said bore, said sleeves having confronting inner ends adapted telescopingly to receive the respective ends of the elements, and means resiliently to urge the sleeves inwardly relative to each other to place the element under compression.

13. A mounting device as claimed in claim 12 wherein one of the sleeves is slidably mounted in the bore in its plate member, and the means resiliently to urge the sleeves inwardly relatively toward each other comprises a compression spring acting between such plate and the sleeve supported thereby.

14. A mounting device as claimed in claim 12 adapted for inclusion in an apparatus having two spaced frame members, the plate members of the mounting device being relatively thick and of such length as to fit accurately between the frame members, and means for securing the plate members together and to the frame members whereby to brace the latter.

15. A mounting device for a plurality of similar and at least generally cylindrical electrical circuit elements, means to mount said elements in a plurality of similar rows, means to mount each element in each row comprising means to receive the respective ends of each element and means resiliently to urge said element receiving means inwardly relatively to each other to place the element under compression.

16. A mounting device for a plurality of similar and at least generally cylindrical electrical circuit elements, means to mount said elements in a plurality of similar rows, means to mount each element in each row comprising an electrically insulating element-cradling support at each end of the element and having said supports secured to said mounting means, and resilient means to urge said element-cradling supports inwardly relatively to each other to place the element under compression.

References Cited in the file of this patent

UNITED STATES PATENTS

| | | |
|---|---|---|
| 1,592,738 | Lea | July 13, 1926 |
| 1,788,066 | Reynders | Jan. 6, 1931 |
| 2,211,780 | Jacobs | Aug. 20, 1940 |
| 2,320,170 | Bishop | May 25, 1943 |
| 2,446,542 | MacInnes | Aug. 10, 1948 |
| 2,450,423 | Fraser | Oct. 5, 1948 |
| 2,508,551 | Sykes | May 23, 1950 |
| 2,734,933 | Klosin | Feb. 14, 1956 |
| 2,778,977 | Lubkin | Jan. 22, 1957 |
| 2,825,009 | McCoy | Feb. 25, 1958 |
| 2,862,992 | Franz | Dec. 2, 1958 |

OTHER REFERENCES

Publication—Page 41 of "Electrical World" magazine, published Oct. 5, 1953.